Aug. 10, 1965
G. NICHOLS
3,200,170
ALUMINUM CHLORIDE CATALYZED POLYMERIZATION PROCESS
Filed Feb. 21, 1962
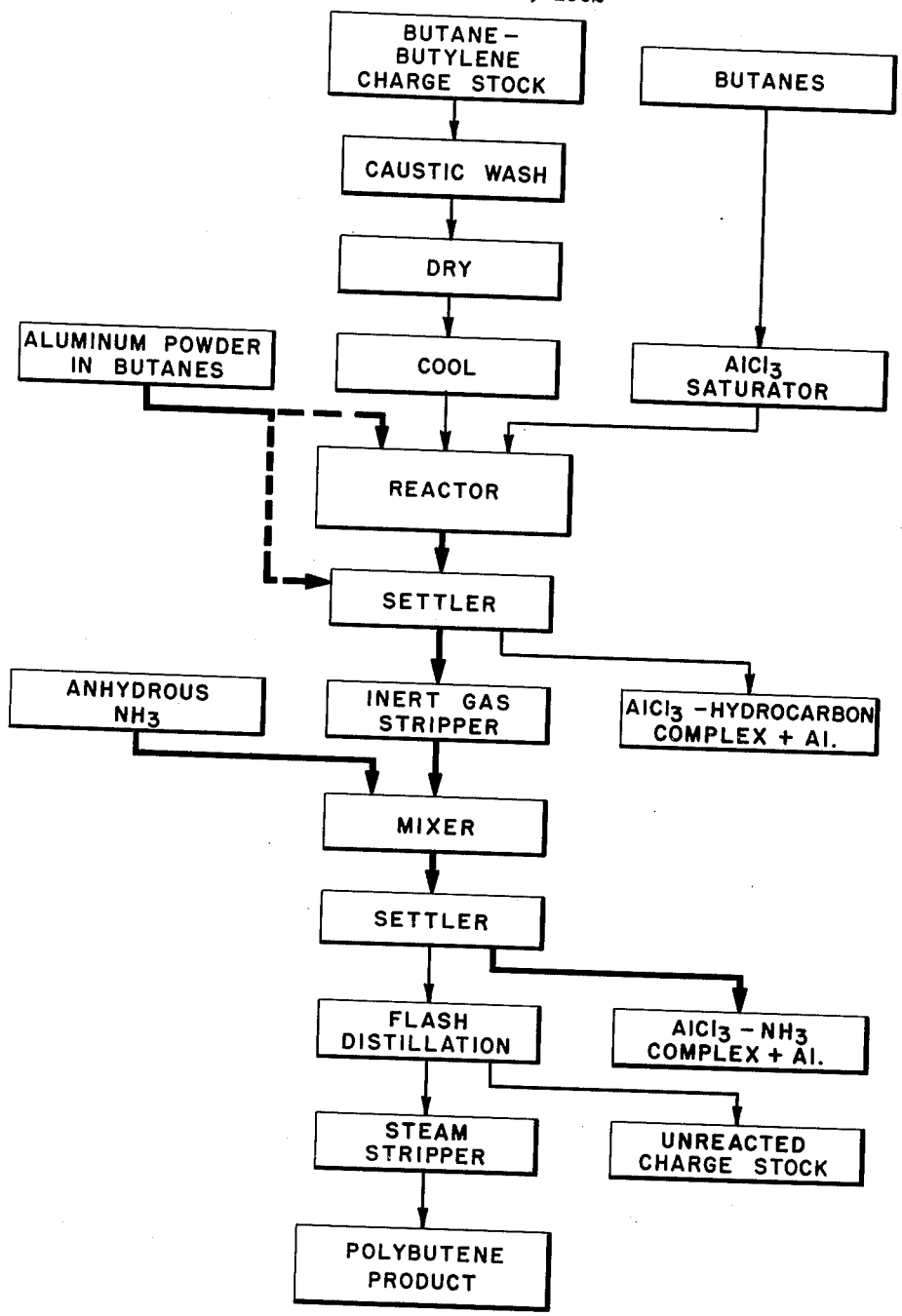
INVENTOR.
Gus Nichols
BY
ATTORNEY

United States Patent Office 3,200,170
Patented Aug. 10, 1965

3,200,170
ALUMINUM CHLORIDE CATALYZED POLYMERIZATION PROCESS
Gus Nichols, Whiting, Ind., assignor to Standard Oil Company, Chicago, Ill., a corporation of Indiana
Filed Feb. 21, 1962, Ser. No. 175,875
10 Claims. (Cl. 260—683.15)

This invention relates to the polymerization of propylene or butylenes with an aluminum chloride catalyst to form viscous liquid olefin polymers. More particularly, it concerns an improved method of separating the aluminum chloride catalyst from reaction mixtures obtained in the aforesaid process.

It has long been known that normally gaseous olefins such as propylene or the various butylenes may be converted to viscous liquid polymers by means of an aluminum chloride catalyst, the catalyst being present as a double compound or complex with hydrocarbons. While such polymerization processes are in wide use, certain problems remain with respect to obtaining clean polymer products.

In the past, much of the polymer quality problem has centered around the removal of aluminum chloride-hydrocarbon complex catalyst from the reaction mixtures. Unless substantially all of the catalyst is so removed, the polymer will be yellowish or even brown, and becomes darker colored upon exposure to atmospheric oxygen.

Recently it has been discovered that aluminum chloride may be removed from polymerization reaction mixtures by treatment with anhydrous ammonia in a proportion sufficient to form an aluminum chloride-ammonia complex; the complex is gel-like or solid, and is readily separable by settling, filtration, or other solid-liquid separation techniques. It is an object of the present invention to provide an improvement on the ammonia treatment procedure, which improvement affords polymer having superior color than was heretofore obtainable. In most instances, the resultant olefin polymers are water white, haze free, and color stable after exposure to oxygen.

According to the invention, the aluminum chloride-ammonia complex is separated from the reaction mixture in the presence of powdered aluminum or zinc metal. Advantageously, the metal is initially present during the reaction, in which event it appears to additionally serve to prolong catalyst activity, although in particular cases (especially when the aluminum chloride catalyst is promoted with free anhydrous hydrochloric acid) the metal may be added after the polymerization reaction has taken place, or may even be added immediately before filtration or other separation of the aluminum chloride-ammonia complex.

The invention, in its various aspects, will be described in the illustrative embodiment below, which is to be read in conjunction with the attached drawing showing a schematic flow sheet of the invention, with dotted lines indicating alternative major addition points for the aluminum powder.

The use of powdered aluminum or zinc metal, or a mixture of both simultaneously serves several functions. First, and primarily, it aids in agglomerating and precipitating the aluminum chloride-ammonium complex by increasing complex particle size. Such modification of the complex materially aids in filtration thereof from the reaction mixture. In addition, and as noted earlier, where the metal is initially added to the reaction mixture during polymerization, it apparently prolongs catalyst activity and actually affords somewhat higher catalyst activity during all portions of a reaction. Furthermore, it presumably reacts with any free hydrogen chloride (or other chlorides) present in the mixture, thereby removing those ingredients which would otherwise tend to discolor the polymer or to reduce its color stability.

As a result of the metal treatment, it is possible to eliminate many of the prior art polymer clean-up procedures. Heretofore such steps as clay treatment, caustic and/or water washing, nitrogen stripping, etc. have all been employed to improve polymer color. However by means of the present invention such treatments may be reduced in severity or even entirely eliminated from a commercial processing scheme.

As applied to a typical polymerization of normal and isobutylene in a petroleum refinery butane-butylenes stream, or from any other source, dry butanes, suitably a depropanized and mercaptan-free butane stream at a temperature of about 175° F.–200° F., e.g., about 180° F. and about 395 p.s.i.a., are passed into the top of a saturator containing a bed of aluminum chloride catalyst. The butane flows through the bed of aluminum chloride at a rate adequate to form an aluminum chloride saturated solution of butanes containing from about 4 pounds to about 10 pounds of aluminum chloride per barrel of the hydrocarbon leaving the bottom of the saturator.

The effluent from the saturator at a temperature of about 175° F. and a dried butane-butylene stream cooled by suitable heat exchange means to a temperature of from about 10° F. to about 30° F., e.g., about 20° F., are separately introduced into the bottom of a polymerization reactor maintained at a temperature of from about 0° F. to about 80° F., preferably about 20° F. to about 40° F. by suitable refrigeration means, such as for example, propane or ammonia refrigeration, and at a sufficient pressure to insure liquid conditions, e.g., about 50–100 p.s.i.g. The aluminum chloride-saturated butanes and the butylenes feed are introduced into the reactor in the ratio of 0.5 to 1.5 pounds catalyst per 100 pounds of olefin in the charging stock. The reactor temperature should be carefully controlled since while increased reactor temperatures increase conversion of total butylenes, it decreases the amount of heavy polymer in the total polymer product.

In some instances it is desirable to employ anhydrous hydrogen chloride as a catalyst promoter. In this event, it is then not desirable to add metal to the reaction zone for the reason that it will react, at least in part, with the HCl to form additional aluminum or zinc chloride and thereby eliminate the benefits of having the metal present. Should it be desired to use an HCl promoter, anhydrous hydrogen chloride may be added to the reaction zone, advantageously in an amount which will be from about 1 percent to about 50 percent, preferably from about 5 to about 20 percent, by weight of the aluminum chloride (hydrocarbon-free basis) in such zone.

However should it be desired to utilize the promotional effects of aluminum or zinc metal on the catalyst in lieu of hydrogen chloride, the appropriate metal may be added to the reaction zone by any suitable technique, e.g., suspension in a portion of the feed stream, preferably in a minor amount by weight relative to the aluminum chloride. Optimum concentrations of either metal appear to be within the range of about 1 percent to about 50 percent by weight based on aluminum chloride (hydrocarbon-free basis), optimally about 5–20 weight percent.

The reactor effluent consisting of polymerized butylenes, aluminum chloride hydrocarbon complex, unreacted hydrocarbons and optional aluminum or zinc metal or excess HCl, are then advantageously passed to a settling drum wherein the major amount of the complex is settled out and withdrawn. The effluent from the settling drum, comprising a solution of polymers containing small amounts of the aluminum chloride complex and unreacted hydrocarbons, is preferably treated by mixing anhydrous ammonia with said effluent at a temperature of about 32°–160° F. whereby the aluminum chloride is precipitated out as a solid-like aluminum chloride-ammonia complex which separates from the clear butylene polymer solution. If not already present, aluminum or zinc metal may be added in the foregoing proportions at this stage. After separation and removal of the aluminum chloride-ammonia complex and the aluminum or zinc metal (by such physical means as filtration, settling, cycloning, centrifugation, or the like) the clear butylenes polymers solution is flash distilled in a flash drum to remove therefrom unreacted hydrocarbons and then passed to a steam stripper (preferably operating at low or subatmospheric pressure) for fractionation into suitable polymer fractions. The unreacted hydrocarbons from the flash drum can be suitably recycled to the butylenes feed stream in amounts necessary to obtain a feed stream of desired composition.

While the invention is applicable to liquid phase polymerization of normally gaseous olefins, such as propylene, isobutylene, normal butylenes, and mixtures thereof, it is primarily directed to the polymerization of a butane-butylene mixture associated with butanes in so-called butane-butylene refinery stream. For example, the charging stock is a petroleum refinery butane-butylene stream containing about 26 weight percent isobutylene, about 37 weight percent normal butylenes, and about 36 weight percent butanes, such stocks usually containing a small amount of propane, propylene, pentanes, and/or pentenes.

The polymers from the inventive process are characterized by being free from haze due to colloidal alumina resulting from aluminum chloride hydrolysis; are of improved color without need for drying and clay treating, cannot cause downstream equipment corrosion for the reason that virtually all of the aluminum chloride has been removed, and are virtually water white and remain so after exposure to air.

The invention will be more fully exemplified in the following illustrative embodiment which describes a complete polymerization supplemented by the inventive treatment with commercial powdered aluminum metal.

*Illustrative embodiment*

A butane-butylene charging stock is washed with a 10 percent caustic solution to remove any mercaptan sulfur and then dried by passing over calcium chloride. The dried stream of charging stock is then cooled to a temperature of about 20° F. (which can be varied from about 0° F. to about 80° F. in order to regulate polymer molecular weight).

Simultaneously, a butanes stream free of mercaptans, water, and butenes, is passed downward through a saturator vessel charged with solid aluminum chloride; the inlet temperature is about 175–200° F., and the inlet pressure is about 395 p.s.i.a. in order to maintain a liquid phase in the saturator.

The saturator effluent consists of butanes having dissolved therein about 5 pounds of aluminum chloride per barrel of butanes, and is passed, along with the butane-butylene charging stock, into the bottom of a suitable agitated reactor vessel. A temperature of about 20° F. is maintained in this vessel by propane refrigeration. The overall concentration of aluminum chloride is preferably within the range of about 0.5 to 1.5 pounds of aluminum chloride per 100 pounds of butylene (butane-free basis).

Simultaneous with the introduction of catalyst and feed stock, a 20 weight percent slurry of commercial powdered aluminum metal in butanes is introduced into the reactor vessel in a proportion sufficient to provide about 10 percent of aluminum metal based on aluminum chloride (hydrocarbon-free basis).

The reaction mixture is maintained in the reactor vessel for a sufficient time to effect substantial polymerization of the butylenes in the charging stock. Thereafter, product effluent is withdrawn from near the top of the vessel, and consists of polymerized butylenes, aluminum chloride-hydrocarbon complex, suspended aluminum metal, and unreacted hydrocarbons such as butylenes and butanes. It is then passed to a settling vessel wherein the bulk of the entrained catalyst complex and a portion of the aluminum metal settle out over a half hour period.

At this point, preceding treatment with anhydrous ammonia, it is desirable to strip any free HCl (formed by hydrolysis of aluminum chloride with traces of moisture in the feed stock) from the reaction mixture by nitrogen stripping the crude polymer solution. This prevents the formation of ammonium chloride which is difficult to filter and which, if not removed and if present in excessive quantities, would be carried into the filtered product. This would deleteriously affect the final polymer when the high temperatures required in vacuum distillation dissociate any ammonium chloride into hydrogen chloride which darkens the polymer.

The settled liquid portion of the reaction mixture is then mixed in a suitably agitated vessel with anhydrous ammonia, added in a quantity at least sufficient to form the stoichiometric $AlCl_3$-$NH_3$ complex. This complex settles out readily as a result of the aluminum metal being present, and hence may be separated by settling; alternatively, the separation procedure may be accelerated by filtration or the like.

The resultant catalyst-free effluent, consisting of clear polymers and unreacted hydrocarbons, is then heated and flashed at a pressure of about 100 p.s.i.g. into a flash drum having a top temperature of about 300° F. and a bottom temperature of about 320° F. Here the unreacted hydrocarbons (together with any excess ammonia) are taken overhead, condensed, and collected.

From the base of the flash drum, the polymer mixture is withdrawn and then steam stripped at 600° F. at atmospheric or reduced pressure; an inert gas may be introduced below the steam-introduction point to insure removal of all water from the heaviest polymer fractions. If conducted at atmospheric pressure utilizing 110 pound steam, a heavy polymer fraction may be withdrawn from the bottom of the stripping tower at about 475° F. while a lighter polymer fraction is taken from the top at about 110° F.

The producion of polymers of various molecular weights may be effected by altering reaction conditions. Lower temperatures favor the production of higher molecular weight, more viscous, polymers, as does increasing the ratio of isobutylene to normal butylene in the feed stock.

The final polymer products, both light and heavy, are water white with no trace of yellow color. The Gardner colorimeter reading is about 0. There is substantially no aluminum or chloride in the polymer.

Thus it is evident that there has been provided an outstanding process for making butylene or propylene polymers of unusual color stability. Although described in conjunction with a preferred specific embodiment above, various other alternatives, modifications, and variations of the invention will be evident to those skilled in the art. For example, as suggested elsewhere, the introduction of aluminum metal to enhance the separability of the aluminum chloride-ammonia complex may be deferred until such separation, as in the case where it is desired to employ free HCl in the reaction zone as a catalyst promoter. In this event, the aluminum metal may be added at any stage subsequent to the reaction, as for example after flashing to remove HCl, before or after settling to remove gross amounts of aluminum chloride-hydrocarbon complex, before introduction of ammonia, or after introduction of ammonia and before separation of the aluminum chloride-ammonia complex.

Other modifications will likewise be suggested to those skilled in the art, and accordingly it is intended to embrace all alternatives, modifications, and variations as fall within the spirit and broad scope of the appended claims.

I claim:
1. In a process wherein normally gaseous olefins selected from the class consisting of propylenes, butylenes, and mixtures thereof are polymerized with an aluminum chloride catalyst to form a reaction mixture comprising olefin polymer in admixture with aluminum chloride-hydrocarbon complex, and wherein at least a portion of said reaction mixture is treated with anhydrous ammonia to form a separable solid-like aluminum chloride-ammonia complex, the improvement comprising effecting separation of said aluminum chloride-ammonia complex in the presence of a material selected from the group consisting of powdered aluminum metal and powdered zinc metal.

2. The process of claim 1 wherein said normally gaseous olefins are butylenes.

3. The process of claim 1 wherein said normally gaseous olefins is a mixture of normal butylenes and isobutylene.

4. The process of claim 1 wherein said normally gaseous olefin is propylene.

5. The process of claim 1 wherein said material is powdered aluminum metal, and is present in the reaction mixture during polymerization.

6. The process of claim 1 wherein said material is powdered aluminum metal, and is introduced into the reaction mixture subsequent to the polymerization but prior to treatment with anhydrous ammonia.

7. The process of claim 1 wherein said material is powdered aluminum metal, and is introduced into the reaction mixture after treatment with anhydrous ammonia.

8. A process comprising: polymerizing normally gaseous olefins selected from the class consisting of propylenes, butylenes, and mixtures thereof in the presence of an aluminum chloride catalyst and powdered aluminum metal to form a reaction mixture; treating said reaction mixture with anhydrous ammonia to form a separable solid-like aluminum chloride-ammonia complex; and separating said aluminum chloride-ammonia complex and said powdered aluminum metal from the reaction mixture.

9. The process of claim 8 wherein said powdered aluminum metal is employed in a proportion of from about 1 to about 50 weight percent based on aluminum chloride.

10. The process of claim 1 wherein said powdered aluminum metal is employed in a proportion of from about 1 to about 50 weight percent based on aluminum chloride.

References Cited by the Examiner

UNITED STATES PATENTS

| | | | |
|---|---|---|---|
| 2,181,640 | 11/39 | Deanesly et al. | 260—683.15 |
| 2,291,510 | 7/42 | Thomas et al. | 260—683.15 |
| 2,517,692 | 8/50 | Mavity | 260—683.15 |
| 2,677,002 | 4/54 | Yahnke et al. | 260—683.15 |

ALPHONSO D. SULLIVAN, *Primary Examiner.*